United States Patent
Relan

(10) Patent No.: US 7,304,992 B2
(45) Date of Patent: Dec. 4, 2007

(54) FAST FLEXIBLE FILTER PROCESSOR BASED ON RANGE CHECKING AND A METHOD OF PROCESSING BASED THEREON

(75) Inventor: Sandeep Relan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 1079 days.

(21) Appl. No.: 10/301,701

(22) Filed: Nov. 22, 2002

(65) Prior Publication Data
US 2004/0100959 A1    May 27, 2004

(51) Int. Cl.
*H04L 12/56*    (2006.01)

(52) U.S. Cl. ...................................... 370/392

(58) Field of Classification Search ................ 370/229, 370/230, 230.1, 231, 235, 389, 392, 475; 707/6, 7
See application file for complete search history.

(56) References Cited

U.S. PATENT DOCUMENTS

| | | | |
|---|---|---|---|
| 5,898,687 A | 4/1999 | Harriman et al. | |
| 5,951,651 A | 9/1999 | Lakshman et al. | |
| 6,173,384 B1 | 1/2001 | Weaver | |
| 6,289,013 B1 | 9/2001 | Lakshman et al. | |
| 6,718,326 B2 * | 4/2004 | Uga et al. ...................... | 707/6 |
| 6,961,725 B2 * | 11/2005 | Yuan et al. ..................... | 707/4 |
| 7,039,053 B1 * | 5/2006 | Freed et al. ................. | 370/392 |
| 7,133,400 B1 * | 11/2006 | Henderson et al. ......... | 370/389 |
| 2003/0174703 A1 | 9/2003 | Relan | |

FOREIGN PATENT DOCUMENTS

| | | |
|---|---|---|
| EP | 0 993 162 A2 | 4/2000 |
| EP | 1 351 110 A1 | 10/2003 |

\* cited by examiner

*Primary Examiner*—Wing Chan
*Assistant Examiner*—Duc Duong
(74) *Attorney, Agent, or Firm*—Squire, Sanders & Dempsey L.L.P.

(57) ABSTRACT

A network component for processing a packet can include a rules table configured to have a plurality of entries, and sets of first storage units within each one of the plurality of entries. The sets of first storage units are configured to store sets of range checking parameters with respect to the packet. The sets of range checking parameters can identify a plurality of packet field values and a plurality of range values. In addition, the network component can include an action implementation unit configured to implement at least one first action with respect to the packet when at least one of the plurality of packet field values falls within a corresponding pair of range values for one of the plurality of entries. The action implementation unit is also configured to implement at least one second action with respect to the packet when each one of the plurality of packet field values falls within each corresponding pair of range values for one of the plurality of entries, and the action implementation unit can implement at least one third action with respect to the packet when each one of the plurality of the packet field values does not fall within each corresponding pair of range values.

24 Claims, 6 Drawing Sheets

FAST FLEXIBLE FILTER PROCESSOR BASED ON RANGE CHECKING AND A METHOD OF PROCESSING BASED THEREON

BACKGROUND OF THE INVENTION

1. Field of the Invention

The present invention relates to a method and an apparatus for high performance packet filtering in a communication network environment such as token ring, ATM, Ethernet, Fast Ethernet, Gigabit Ethernet and 10 Gigabit Ethernet or any other networking environment. In particular, the present invention relates to a fast and flexible packet filter and a method for filtering a packet that can be implemented in a network component, which may include discrete devices or which may be implemented on a semiconductor substrate such as a silicon chip.

2. Description of the Related Art

In networking applications, an incoming packet enters an ingress port of a network component, such as a switch. The network component processes the incoming packet and directs it to an egress port. In processing the incoming packet, the network component can examine the incoming packet on the ingress side, and can determine addressing and routing information to enhance network performance.

The network component can apply various addressing and processing logic to the incoming packet, when examining the incoming packet on the ingress side therein. As the demand for higher speed and lower cost network components increases, so does the demand for an innovative system to meet such demand. Accordingly, a fast and flexible processing logic for a network component is important since it can benefit the communication network environment.

SUMMARY OF THE INVENTION

One example of the present invention can include a method of processing a packet in a communication network. The method can include the steps of receiving a packet within a network device, determining a plurality of packet field values with respect to the packet based on sets of range checking parameters within a rules table, and identifying a plurality of range values as set forth in the sets of range checking parameters within a plurality of entries of the rules table. In addition, the method can include the steps of implementing at least one first action with respect to the packet when at least one of the plurality of packet field values falls within a corresponding pair of range values for one of the plurality of entries, implementing at least one second action with respect to the packet when each one of the plurality of packet field values falls within each corresponding pair of range values for one of the plurality of entries, and implementing at least one third action with respect to the packet when each one of the plurality of the packet field values does not fall within each corresponding pair of range values.

In another example, the present invention can relate to a network component for processing a packet. The network component can have a rules table configured to have a plurality of entries, and sets of first storage units within each one of the plurality of entries, said sets of first storage units are configured to store sets of range checking parameters with respect to the packet, wherein the sets of range checking parameters identify a plurality of packet field values and a plurality of range values. The network component can also have an action implementation unit configured to implement at least one first action with respect to the packet when at least one of the plurality of packet field values falls within a corresponding pair of range values for one of the plurality of entries, wherein the action implementation unit is configured to implement at least one second action with respect to the packet when each one of the plurality of packet field values falls within each corresponding pair of range values for one of the plurality of entries, and wherein the action implementation unit implements at least one third action with respect to the packet when each one of the plurality of the packet field values does not fall within each corresponding pair of range values.

Furthermore, another example of the present invention can provide a system for processing a packet in a communication network. The system can have a means for receiving a packet within a network device, a means for determining a plurality of packet field values with respect to the packet based on sets of range checking parameters within a rules table, and a means for identifying a plurality of range values as set forth in the sets of range checking parameters within a plurality of entries of the rules table. In addition, the system can include a means for implementing at least one first action with respect to the packet when at least one of the plurality of packet field values falls within a corresponding pair of range values for one of the plurality of entries, a means for implementing at least one second action with respect to the packet when each one of the plurality of packet field values falls within each corresponding pair of range values for one of the plurality of entries, and a means for implementing at least one third action with respect to the packet when each one of the plurality of the packet field values does not fall within each corresponding pair of range values.

BRIEF DESCRIPTION OF THE DRAWINGS

For proper understanding of the invention, reference should be made to the accompanying drawings, wherein.

Figure 1:
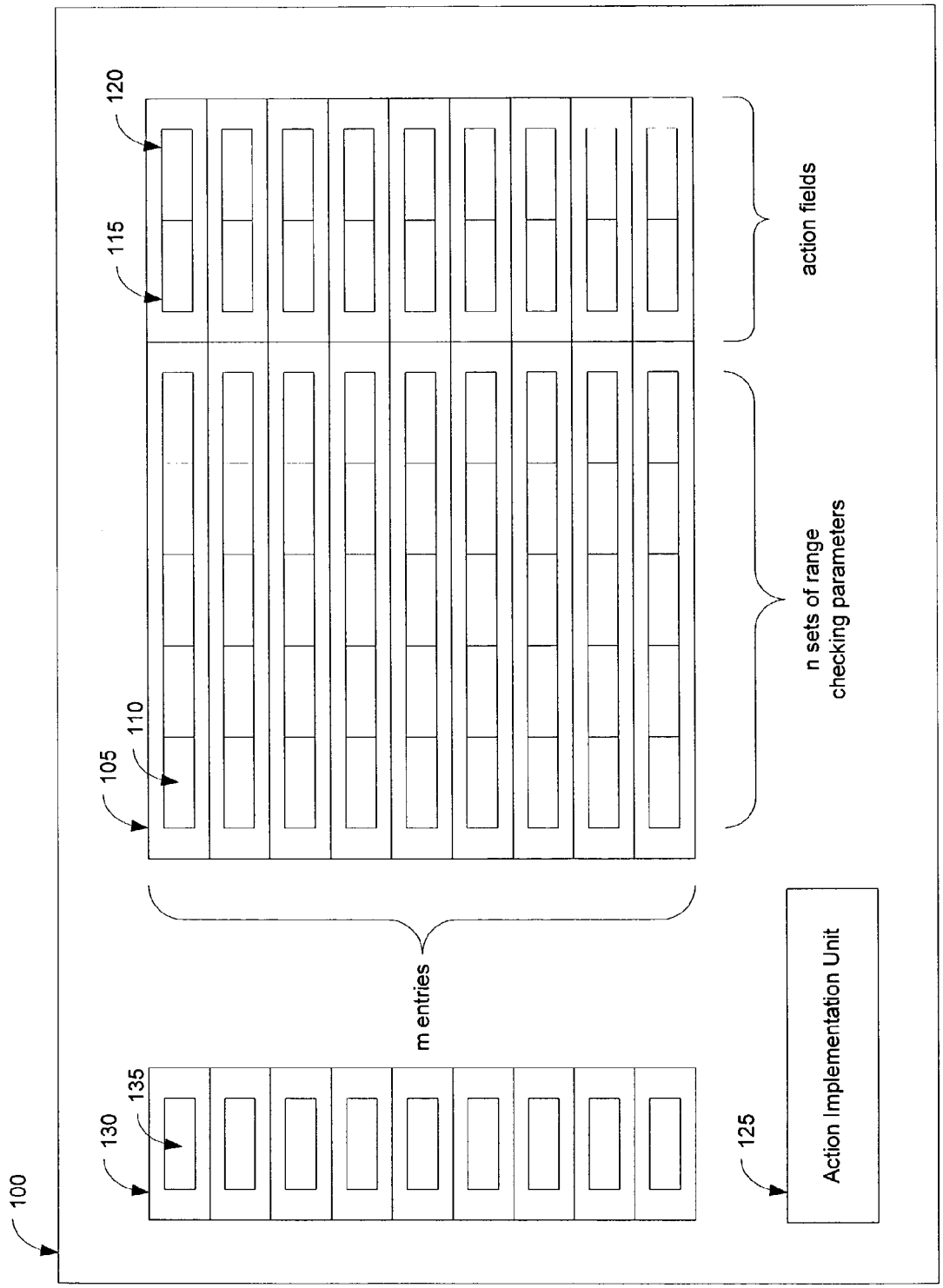
FIG. 1 illustrates one example of a configuration for filtering a packet according to the present invention.

DETAILED DESCRIPTION OF THE PREFERRED EMBODIMENT(S):

FIG. 1 illustrates one example of a hardware configuration that can perform packet filtering based on a fast flexible range checking processor, in accordance with the present invention. The performance of packet filtering can also be referred to as packet classification. Therefore, the hardware configurations and examples provided herein can also perform packet classification.

In addition, the hardware configuration of FIG. 1 can be in an integrated, modular and single chip solution, and therefore can be embodied on a semiconductor substrate, such as silicon. Alternatively, the hardware configuration of FIG. 1 can be a plurality of discrete components on a circuit board. The configuration can also be implemented as a general purpose device configured to implement the invention with computer software.

FIG. 1 shows a network device 100 that can filter a packet based on a range checking processor. It is noted that although the network device can filter a packet, said network device 100 can process data in any data format, including but not limited to a data packet, a data frame, or a data cell.

The network device 100 of FIG. 1 can include a rules table 105, an action implementation unit 125, and a plurality of storage units 130. The rules table 105, for example, can comprise a plurality of rules entries. FIG. 1 shows a rules table 105 having "m" entries. Each entry within the rules table can include plural sets of range checking parameters and a plurality of action fields 115, and 120. FIG. 1, for example, shows that each entry within the rules table 105 can have "n" sets of range checking parameters, and action fields 115, 120.

Figure 2:
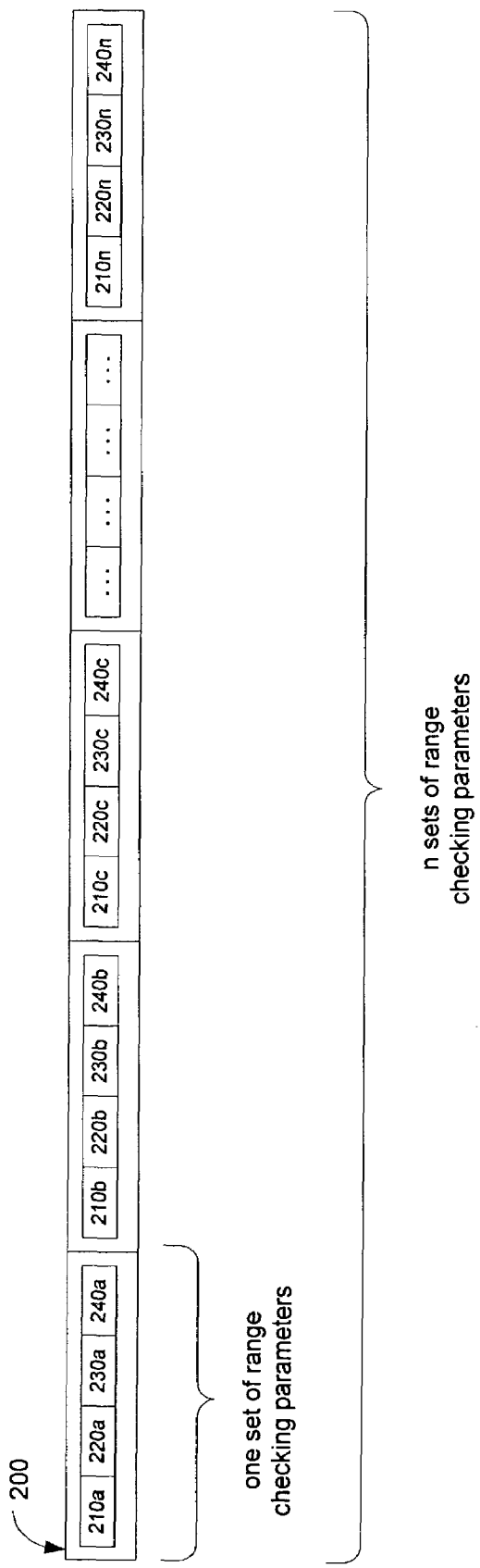
FIG. 2 illustrates one example of a rules entry within a rules table according to the present invention.

FIG. 2 illustrates one example of an entry 200 within rules table 105. Entry 200 can have a plurality of range checking parameters. In this example, entry 200 has "n" sets of range checking parameters. Each one set of range checking parameters within entry 200 can include at least four storage units 210a-n, 220a-n, 230a-n, and 240a-n, respectively. For instance, the first set of range checking parameters within entry 200 can include storage units 210a, 220a, 230a and 240a, and the second set of range checking parameters can include 210b, 220b, 230b and 240b, and so forth. Each storage unit 210a-n, 220a-n, 230a-n, and 240a-n can be any memory storage unit, such as a register, and can store programmable values or information therein, and can be of any width or bit length.

Figure 3:
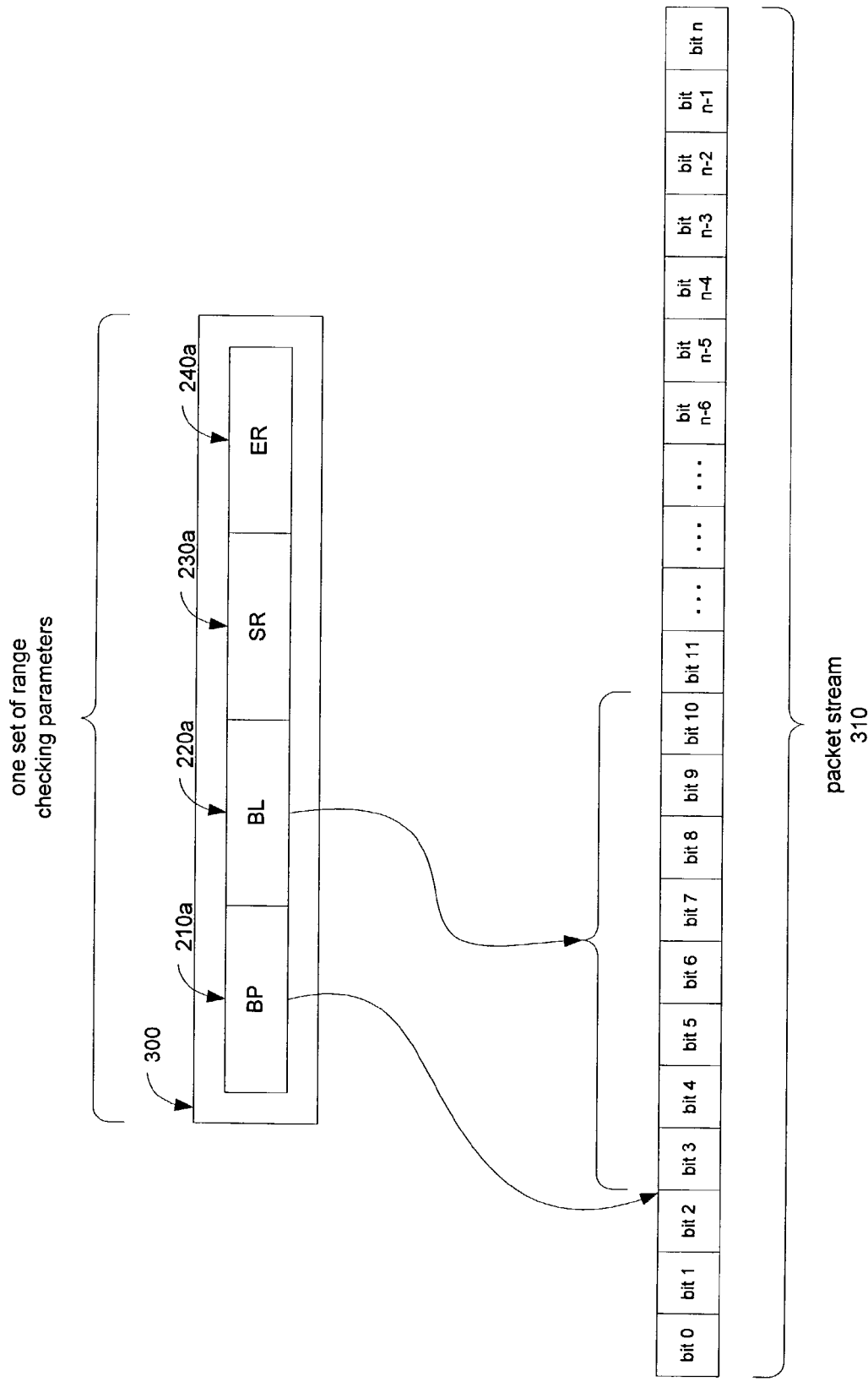
FIG. 3 illustrates one example of a set of range checking parameters within a rules table entry in relation to a packet stream according to the present invention.

FIG. 3 illustrates one example of a set of range checking parameters 300 within entry 200 with respect to one example of a packet stream 310. The set of range checking parameters 300 can include storage units 210a, 220a, 230a and 240a, and the packet stream 310 can have a plurality of "n" bits, such as 256 bits. Each bit within the packet stream 310 can represent a bit value.

The storage unit 210a of FIG. 3 can be a register for storing a bit position value BP with respect to a packet stream, such as packet stream 310. The bit position value BP can be a programmable value that can identify or represent a predetermined bit position within a packet stream. Therefore, the bit position value BP can be a value that represents the starting bit position of a particular packet field or a particular packet section within a packet stream 310. For example, the bit position value BP can be a predetermined programmable binary value equivalent to decimal value 3 which can identify or represent the starting bit position 3 within the packet stream 310.

It is noted that the packet stream 310 can be in any known format such as a Ethernet-II format, a 802.3 SNAP Ethernet format or any Ethernet standard format. It is further noted that the present invention can therefore filter and process a packet stream 310 of any format by incorporating a mask table or a Fast Filter Processor (FFP) within the network device 100 of FIG. 1 (not shown). The FFP can receive the incoming packet stream 310 in any packet format and can dynamically re-position the bit position BP of the packet stream 310 based on the specific type of packet format received.

In addition, storage unit 220a of FIG. 3 can also be a register for storing a bit length value BL. The bit length value BL can be a programmable value that identify or represent a predetermined bit length of a packet field within a packet stream 310, starting from the bit position BP. In other words, the bit length value BL represents a number of bits with respect to the packet field to be identified from a packet stream 310. The bit length value BL can be any value, such as from zero to the value required to indicate the maximum number of bits in the packet stream 310. In other words, the bit length value BL can be a value that represents a number of bits from the starting bit position BP of a packet field to be identified from a packet stream 310. For example, the bit length value BL can be a predetermined programmable binary value equivalent to decimal value 8. A bit length value BL of 8 can identify or represent a number of bits from the starting bit position 3 within a packet stream 310, for identifying a packet field within the packet stream 310. As such, a bit position value BP of 3 stored in register 210a, and a bit length value BL of 8 stored in 220a can be determined and utilized to identify a packet field having 8 bits in length and including bits 3, 4, 5, 6, 7, 8, 9 and 10 within a packet stream 310. The identified packet field can thereafter be used to determine a packet field value with respect to the corresponding set of range checking parameters. It is noted that the present invention can, for example, disable a set of range checking parameters by setting the bit length value BL to zero and can be enabled by programming the bit length value BL to be greater than zero.

Furthermore, the one set of range checking parameters of FIG. 3 can include storage units 230a and 240a. Storage unit 230a can be a register configured to store one range value out of a plurality of range values. For example, the storage unit 230a can store a starting range value SR out of a plurality of range values. The starting range value SR can be a binary value or a value in various formats. Furthermore, the starting range value SR can be a programmable value that can identify or represent a predetermined lower boundary value of a range of values. Therefore, the starting range value SR can identify or represent a lower boundary value of a range of values in which an identified packet field value can be compared with or checked against.

Similarly shown in FIG. 3 is a storage unit 240a configured to store another range value out of a plurality of range values. For example, the storage unit 240a can store an ending range value ER out of a plurality of range values. The storage unit 240a can also be a register for storing an ending range value ER. Like the starting range value SR, the ending range value ER can be a binary value or a value in various formats. Furthermore, the ending range value ER can be a programmable value that can identify or represent a predetermined upper boundary value of a range of values. Therefore, the ending range value ER can identify or represent an upper boundary value of a range of values in which an identified packet field value can be compared with or checked against.

Accordingly, the storage unit 230a can store a starting range value SR which can specify or represent the lower boundary value of a plurality of range values, and the storage unit 240a can store an ending range value ER which can specify or represent the upper boundary value of the plurality of range values. In other words, the starting range value SR and the ending range value ER are a pair of range values that can identify or set a lower boundary and an upper boundary for a particular range of values. Once the boundaries of the range of values are identified, a corresponding packet field value determined from the bit position value BP and the bit length value BL, can be compared with or checked against the range of values established by the starting range value SR and the ending range value ER.

It is noted that the processor based on range checking of the present invention can perform range checking based on the inclusion of the starting range value SR and the ending range value ER, or can perform range checking based on the exclusion of these values.

Referring to the example in FIG. 1, the rules table 105 can comprise of a plurality of entries wherein each entry can include plural sets of range checking parameters. Therefore, each entry within the rules table 105 can have a plurality of bit position values BP, a plurality of bit length values BL, a plurality of starting rang values SR and a plurality of ending range values ER, corresponding to each other. The plurality of bit position values BP together with the corresponding plurality of bit length values BL can identify a plurality of packet fields in which a plurality of corresponding packet field values can be determined therefrom. Accordingly, the plurality of packet field values are compared with or checked against a plurality of corresponding pairs of starting range values SR and ending range values ER to determined if any one of the packet field values is within range of the corresponding starting range values SR and ending range values ER. If it is determined that the packet field value is within the pair of corresponding starting and ending range values, then conditions set forth within the corresponding set of range checking parameters are thereby satisfied and/or met. Thus, a match is made.

Further shown within rules table 105 of FIG. 1 are a plurality of action fields 115 and 120. Each pair of action fields 115, 120 can correspond to each entry within the rules table 105. The action fields 115 and 120 can, for example, be a fixed set of bit strings, wherein each bit within the bit strings can be set, such as with a binary value "1" or "0". Accordingly, the action field 115 can be a fixed bit string wherein each bit within the bit string can be set for an exact match action to be taken on a packet. In other words, at least one exact match action set forth in the action field 115 can be implemented on a packet when the conditions as set forth in each and every set of range checking parameters within the corresponding entry of the rules table, are satisfied and/or met, and therefore a complete or exact match is made. For example, if each of the packet field values is within the corresponding range of values as set forth in each of the sets of range checking parameters within an entry of the rules table, then an exact match is made and the exact match action(s) as set forth in the exact match action field 115 can be implemented.

In addition, the action field 120 can also be a fixed bit string wherein each bit within the bit string can be set for a partial match action to be taken on a packet. In other words, at least one partial match action set forth in the action field 120 can be implemented on a packet when there is no complete or exact match and the conditions as set forth in at least one set of range checking parameters within the corresponding entry of the rules table is satisfied and/or met, and therefore at least one match is made. For example, if at least one of the packet field values is within the corresponding range of values as set forth in at least one corresponding set of range checking parameters within an entry of the rules table, then a partial match is made and the partial match action(s) as set forth in the partial match action field 115 can be implemented.

FIG. 1 also illustrates an action implementation unit 125 that can be configured to implement various actions on the packet. For example, the action implementation unit 125 can implement at least one exact match action when there is an exact match condition with respect to the sets of range checking parameters within an entry of the rules table 105. Similarly, the action implementation unit 125 can also implement at least one partial match action when there is a partial match condition with respect to the sets of range checking parameters within an entry of the rules table 105. Moreover, the action implementation unit 125 can implement at least one default no-match action and/or at least one pre-programmed no-match action when there is a no-match condition with respect to each and every sets of range checking parameters within the rules table 105. In other words, if each and every packet field value within each of the sets of range checking parameters does not fall within the corresponding pair of range values, then a no-match condition exists, which can activate the action implementation unit 125 to implement at least one default no-match action and/or to implement at least one pre-programmed no-match action on the packet.

Furthermore, FIG. 1 also illustrates a plurality of storage units 130. Each of the storage units 130 can be a register configured to store a precedence field value 135, wherein the precedence field value 135 can correspond to an entry with the rules table 105. The precedence field value 135 can be a binary value or a value in various formats. Furthermore, the precedence field values 135 can be a programmable value that can identify or represent the precedence of the entries with the rules table 105. Accordingly, if more than one entry satisfy the condition of either an exact match or partial match, then the entry with the corresponding highest precedence field value 135 is determined to take precedence over the other entries, and therefore, the corresponding action(s) within the action field can be implemented. It is noted that the precedence field value 135 can be pre-programmed to be in any order. It is further noted that storage units 130 for storing precedence field value 135 can be one example of the present invention to resolve the condition of multiple exact match or partial match.

Figure 4:
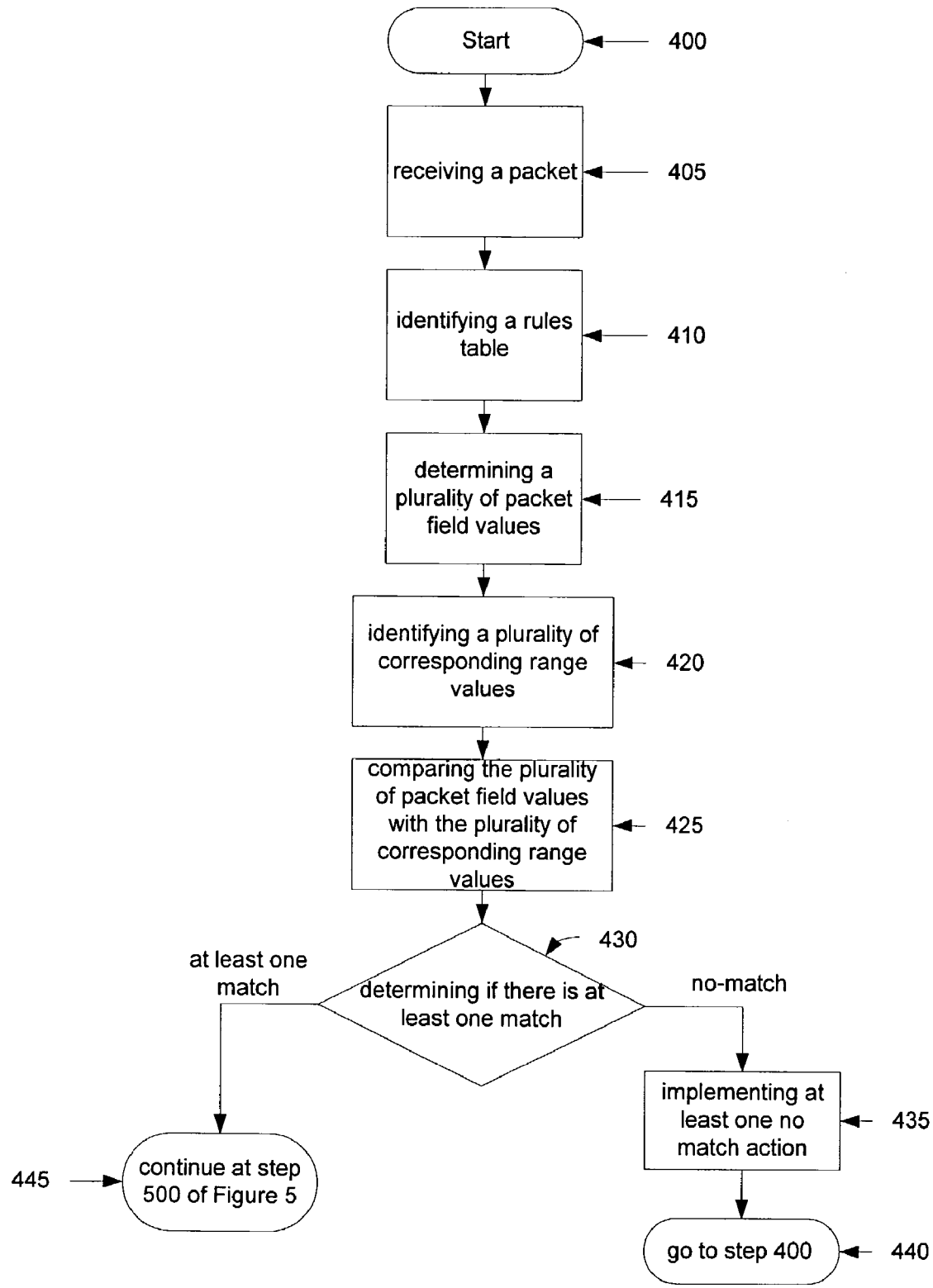
FIG. 4 illustrates a flow chart illustrating one example of a method of filtering a packet according to the present invention.

FIG. 4 illustrates one example of a method of filtering incoming packets in accordance with the present invention. The method of the present example can be implemented in hardware, or software, or a combination of both hardware and software.

An ingress port in a network device can receive at least one packet stream 310 therein. A packet stream 310 can be of any length. The Ingress extracts a predetermined pack length, such as a bit length of 256 bits starting at bit 0 and ending at bit 255. Accordingly, a packet stream can be received in an ingress port of a network device at step 400 of FIG. 4.

As mentioned above, network device 100 can include a rules table 105, an action implementation unit 125, and a plurality of storage units 130. In addition, the network device 100 can also include a mask table (not shown)., After a packet is received in a network device 100, the present invention can mask the packet received using a mask table to format the packet into a known bit stream. In other words, an incoming packet stream can be in any known format such as a Ethernet-II format, a 802.3 SNAP Ethernet format or any Ethernet standard format. Therefore, the mask table can received the packet stream in any packet format, and can format the packet stream into a known bit stream based on the specific type of packet format received. Thereafter, the present invention can identify a rules table 105 within the network device 100 at step 410 of FIG. 4.

The rules table 105 can have "m" entries, and each entry within the rules table 105 can comprise plural sets of range checking parameters. As shown in FIG. 3, one example of a set of range checking parameters 300 can include storage units 210a, 220a, 230a and 240a, wherein the storage unit 210a can store a bit position value BP with respect to a packet stream, and wherein the storage unit 220a can also store a bit length value BL with respect to the packet stream. Having identified the rules table 105 containing plural sets of range checking parameters therein, the present invention can determine a plurality of packet fields based on the bit position values BP and the bit length values BL within the plural sets of range checking parameters. The identified packet field can thereafter be used to determine corresponding packet field values at step 415.

Further shown in FIG. 3 are storage units 230a and 240a. Storage unit 230a can store a starting range value SR, wherein the starting range value SR can identify or represent a predetermined lower boundary value of a range of values. In addition, storage unit 240a can store an ending range value ER, wherein the ending range value ER can identify or represent an upper boundary value of a range of values. Once a plurality of packet field values are identified, FIG. 4 illustrates the step of identifying a plurality of corresponding range values at 420, wherein each pair of range values comprises of a starting range value SR and an ending range value ER.

After the boundaries of a plurality of range values are identified, a plurality of corresponding packet field values determined from the bit position value BP and the bit length value BL, can be compared with or checked against the range of values established by the starting range value SR and the ending range value ER at step 425 of FIG. 4.

Upon comparing the plurality of packet field values with the plurality of corresponding range values, the present invention at step 430 can determine whether at least one packet field value falls within a corresponding range of values as set forth by the starting range value SR and the ending range value ER. If it is determined at step 430 that none of the plurality of packet field values as set forth in the plural sets of range checking parameters within the rules table fall within the corresponding range values, then an action implementation unit 125 can implement at least one no-match action with respect to the packet received at step 435 of FIG. 4. Suppose for example a rules table contains ten entries, and each entry can include five sets of range checking parameters and corresponding action fields. Accordingly, the rules table contains a total of fifteen sets of range checking parameters. Therefore, if each and every one of the fifteen packet field values as set forth in the fifteen sets of range checking parameters does not match with or fall within the corresponding pairs of range values, then it is determined that there is a no-match at step 430, and at least one no-match action can be implemented on the packet received.

On the other hand, if at least one packet field value as set forth in the plural sets of range checking parameters does indeed fall within a corresponding pair of range values, then the present invention can determine if there is more than one packet field value within the rules table that fall within the corresponding pairs of range values in more than one entry within the rules table at step 510. In other words, if at least one packet field value as set forth in the plural sets of range checking parameters falls within the corresponding starting range value SR and the corresponding ending range value ER, then at step 510, the invention can determine if there is more than one entry within the rules table wherein the packet field value matches a values set forth in a corresponding range of values. Further to the example mentioned above, if at least one of the fifteen packet field values matches with or falls within the corresponding pair of range values, then it is determined if more than one of the ten entries contain a match of the packet field values at step 510.

If it is determined that only one entry within the rules table contains matching packet field values, then the present invention can determine if there is an exact match or a partial match regarding each and every packet field value within the one entry at step 540. For instance, if each and every one of the packet field value as set forth in the sets of range checking parameters within the one entry falls within its corresponding pair of range values, then it is determined to be an exact match of the packet field values. In contrast however, if not all of the packet field value fall within its corresponding pair of range values, then it is determined to be a partial match of the packet field values.

Figure 5:
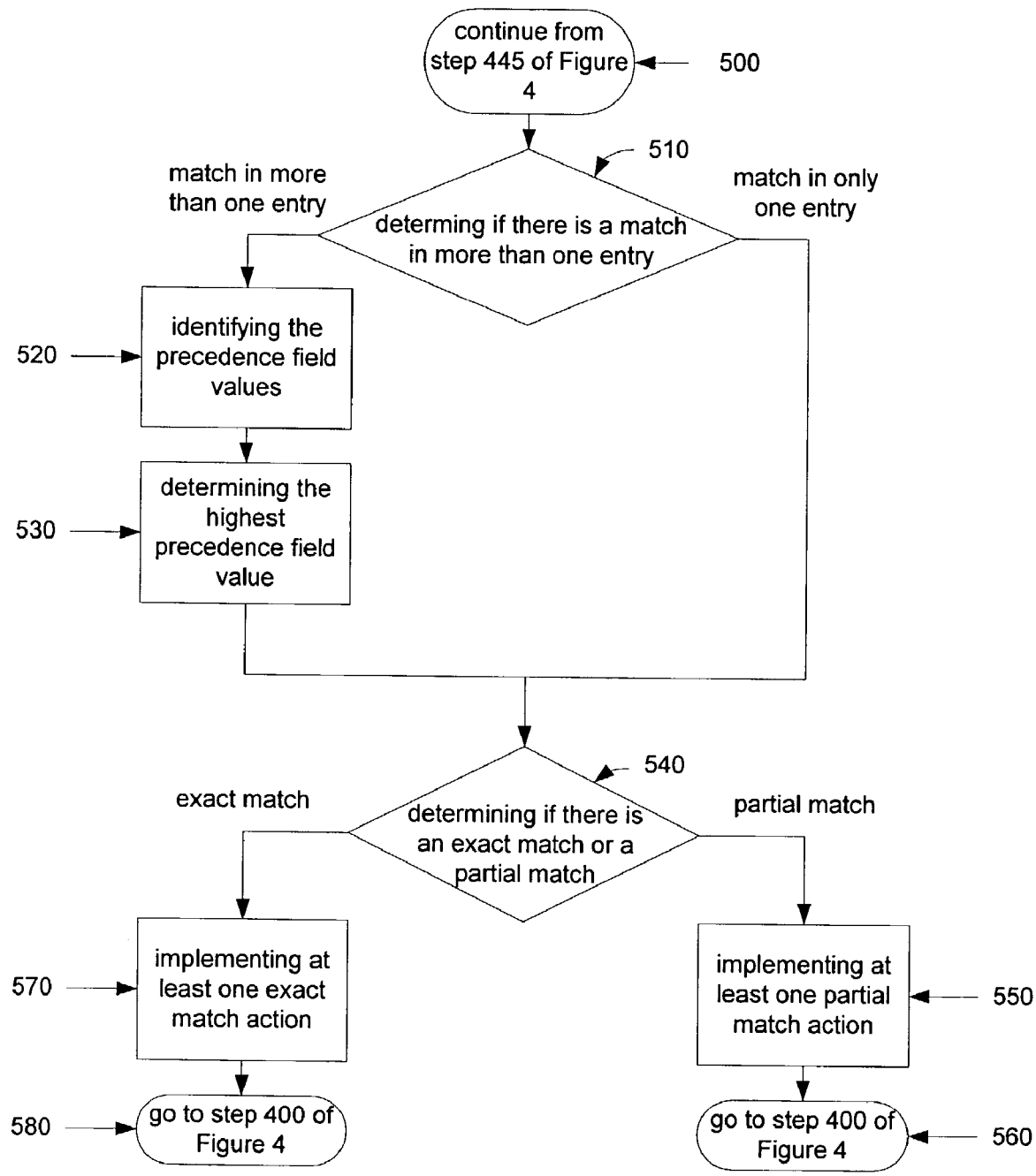
FIG. 5 illustrates a flow chart illustrating one example of a method of filtering a packet according to the present invention.

Accordingly, an action implementation unit can implement at least one exact match action as set forth in the corresponding exact match action field at step 570 of FIG. 5 when it is determined that there is an exact match of the packet field values. However, the action implementation unit can implement at least one partial match action as set forth in the corresponding partial match action field at step 550 of FIG. 5 when it is determined that there is a partial match action of the packet field values. Using the example mentioned above, if it is determined that only one out of the ten entries contains at least one matching packet field value, then it is further determined in this example whether said entry is an exact match entry or a partial match entry at step 540. Therefore, an exact match entry occurs in this example when each and every one of the five packet field values as set forth by the five sets of the range checking falls within the five corresponding range values. A partial match entry occurs in this example when any one or more, but not all five, of the packet field values falls within the one or more corresponding range values.

Referring to step 510 of FIG. 5, the present invention can determine if there is more than one entry within the rules table that have at least one matching packet field value. In other words, once it is determined that the rules table contains at least one matching packet field value, then the invention further determines if more than one entry contain a match of the packet field values at step 510. If it is determined at step 510 that there is indeed a match of packet field values within more than one entry of a rules table, then the invention can identify the entries having at least one matching packet field value and their corresponding storage units 130. The invention can further identify the precedence field values stored the corresponding storage units at step 520.

After identifying the corresponding storage units and the precedence field values stored therein at step 520, the invention can determine the highest precedence field value out of all the identified precedence field values at step 530. Suppose for example, seven out of the ten entries within a rules table each comprises of at least one matching packet field value therein. The storage units corresponding to the seven entries can be identified and the precedence field values stored within the seven storage units can also be identified at step 520. Once the seven corresponding precedence field values are identified, the present invention can determine which one of the seven precedence field values is the highest precedence field value.

Thereafter, the entry corresponding to the determined highest precedence field value is selected to determine if the entry is an exact match entry or a partial match entry at step 540. For instance, if each and every one of the packet field value as set forth in the sets of range checking parameters within the selected entry falls within its corresponding pair of range values, then it is determined to be an exact match of the packet field values. In contrast however, if each and every one of the packet field value does not fall within its corresponding pair of range values, then it is determined to be a partial match of the packet field values.

Accordingly, an action implementation unit can implement at least one exact match action as set forth in the corresponding exact match action field at step 570 of FIG. 5 when it is determined that there is an exact match of the packet field values. However, the action implementation unit can implement at least one partial match action as set forth in the corresponding partial match action field at step 550 of FIG. 5 when it is determined that there is a partial match action of the packet field values. Using the example mentioned above, when the entry having the highest precedence field values is determined or selected, then it is further determined in this example whether said entry is an exact match entry or a partial match entry at step 540. Therefore, an exact match entry occurs in this example when each and every one of the five packet field values as set forth by the five sets of the range checking falls within the five corresponding range values. A partial match entry occurs in this example when any one or more, but not all five, of the packet field values falls within the one or more corresponding range values.

If it is determined that the entry is an exact match entry, then at least one corresponding exact match action within the exact match action field can be implemented at step 570. However, if it is determined that the entry is a partial match entry, then at least one corresponding partial match action within the partial match action field can be implemented at step 550 of FIG. 5.

Figure 6:
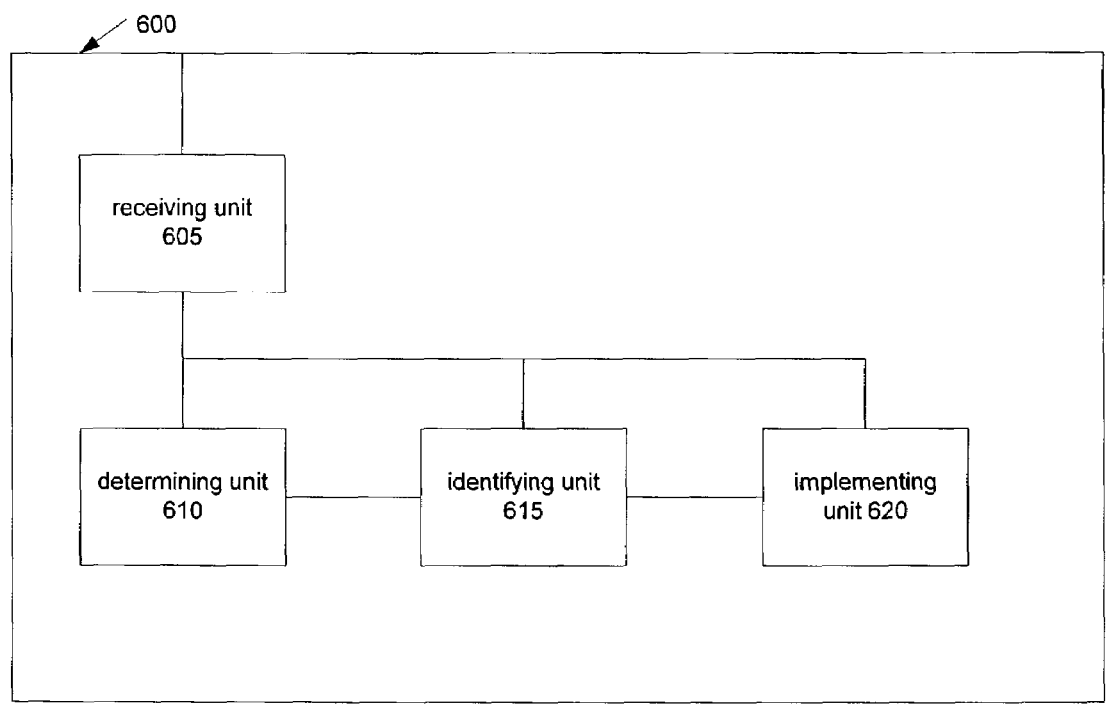
FIG. 6 illustrates illustrating another example of a configuration of filtering a packet according to the present invention.

FIG. 6 illustrates one example of a configuration in accordance to the present invention. FIG. 6 shows a system 600 for filtering a packet based on range checking. The system 600 can include a receiving unit 605. The receiving unit 605 can receive a packet within a network device. The system 600 can also include a determining unit 610. The determining unit 610 can determine a plurality of packet field values with respect to the packet received. In addition, the determining unit 610 can determine the plurality of packet field values based on the sets of range checking parameters within a rules table. Furthermore, the determining unit 610 can determine a plurality of packet fields, and determine a greatest precedence field value from the plurality of field values. The system 600 of FIG. 6 can also include an identification unit 615, wherein the identification unit 615 can identify a plurality of range values as set forth in the sets of range checking parameters. Also, the identification unit 615 can identify a plurality of bit positions, can identify a plurality of bit lengths, and can identify a plurality of starting range values and ending range values. In addition, the identification unit 615 can identify a plurality of precedence field values corresponding to the plurality of entries.

FIG. 6 also shows an implementing unit 620. The implementing unit 620 can implement a plurality of actions. In other words, the implementing unit can implement at least one partial-match action when there is a partial-match with respect to the preprogrammed conditions; can implement at least one full-match action when there is a full-match with respect to the preprogrammed conditions; and can implement at least one no-match action where there is a no-match with respect to the pre-programmed conditions. In addition, the implementing unit 620 can implement at least one action associated with the greatest precedence value.

Although the invention has been described based upon these preferred embodiments and examples, it is noted that the method of and a filter for processing a packet based on fast flexible range checking in accordance with the present invention can be flexible in the manner of implementation. For example, the method of and a filter for processing a packet based on fast flexible range checking can be implemented as soon as a packet stream 310 arrives in a network device or filter, or can be implemented as a packet stream 310 is being parsed, or can be implemented after the packet stream 310 is parsed, or can be implemented when the packet stream 310 is made available after some processing and modifications thereto, or can be combined with multi-field exact match checking, wherein a set of range checking fields can be combined as a set of extension registers to a set of exact match registers. Furthermore, the present invention can perform exact packet field value match. In other words, the starting range value SR and the ending rang value ER can be programmed or set to have a equivalent value, where SR=ER. Therefore, rather than having a range of values to match against, the present invention can match against only one value.

The above-disclosed configurations of the present invention can be in an integrated, modular, and single chip solution and can be embodied on a semiconductor substrate, such as silicon. Furthermore, the methods of filtering a packet as disclosed herein can be implemented in hardware, or software, or a combination of both hardware and software. Additionally, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of processing a packet in a communication network, said method comprising:

receiving a packet within a network device;

determining a plurality of packet field values with respect to the packet based on sets of range checking parameters within a rules table;

identifying a plurality of range values as set forth in the sets of range checking parameters within a plurality of entries of the rules table;

implementing at least one first action with respect to the packet when at least one of the plurality of packet field values falls within a corresponding pair of range values for one of the plurality of entries;

implementing at least one second action with respect to the packet when each one of the plurality of packet field values falls within each corresponding pair of range values for one of the plurality of entries; and implementing at least one third action with respect to the packet when each one of the plurality of the packet field values does not fall within each corresponding pair of range values, wherein the method provides a flexible range checking processing to increase the speed and performance of packet filtering and processing in the communication network.

2. The method of claim 1, wherein determining the plurality of packet field values comprises:
identifying a plurality of bit positions within the packet as set forth in the sets of range checking parameters, wherein at least one of the plurality of bit positions corresponds to a bit position value; and
identifying a plurality of bit lengths as set forth in the sets of range checking parameters, wherein at least one of the plurality of bit lengths corresponds to a bit length value.

3. The method of claim 2, wherein determining the plurality of packet field values further comprises:
determining a plurality of packet fields, wherein at least one of the plurality of packet fields begins at a respective bit position and ends at an ending position, wherein the ending position is a sum of a corresponding bit position value and a corresponding bit length value.

4. The method of claim 1, wherein identifying the plurality of range values comprises:
identifying a plurality of starting range values and a plurality of respective ending range values as set forth in the sets of range checking parameters within the rules table.

5. The method of claim 1, further comprising:
identifying a plurality of precedence field values corresponding to the plurality of entries when the at least one of the plurality of packet field values falls within the corresponding pair of range values for more than one of the plurality of entries.

6. The method of claim 5, further comprising:
determining a greatest precedence field value from the plurality of precedence field values that correspond to the more than one of the plurality of entries having at least one of the plurality of packet field values falling within the corresponding pair of range values; and
implementing the at least one first action corresponding to the greatest precedence field value.

7. The method of claim 1, further comprising:
identifying a plurality of precedence field values corresponding to the plurality of entries when each one of the plurality of packet field values falls within each one of the corresponding pair of range values for more than one of the plurality of entries.

8. The method of claim 7, further comprising:
determining a greatest precedence field value from the plurality of precedence field values that correspond to the more than one of the plurality of entries having each one of the plurality of packet field values falling within each one of the corresponding pair of range values; and
implementing the at least one second action corresponding to the greatest precedence field value.

9. A network component for processing a packet, said network component comprising:
a rules table configured to have a plurality of entries;
sets of first storage units within each one of the plurality of entries, said sets of first storage units are configured to store sets of range checking parameters with respect to the packet, wherein the sets of range checking parameters identify a plurality of packet field values and a plurality of range values; and
an action implementation unit configured to implement at least one first action with respect to the packet when at least one of the plurality of packet field values falls within a corresponding pair of range values for one of the plurality of entries, wherein the action implementation unit is configured to implement at least one second action with respect to the packet when each one of the plurality of packet field values falls within each corresponding pair of range values for one of the plurality of entries, and wherein the action implementation unit implements at least one third action with respect to the packet when each one of the plurality of the packet field values does not fall within each corresponding pair of range values.

10. The network component of claim 9, wherein the sets of first storage units are configured to store sets of range checking parameters, and wherein each set of range checking parameters comprises of a bit position, a bit length, a starting range and an ending range with respect to the packet.

11. The network component of claim 10, wherein the sets of first storage units are configured to store sets of range checking parameters, wherein each of the bit position corresponds to a bit position value, and wherein each of the bit length corresponds to a bit length value.

12. The network component of claim 11, wherein the sets of first storage units are configured to store sets of range checking parameters, wherein each one of the bit position and each one of the bit length identifies a packet field, wherein the packet field begins at the bit position and ends at an ending position, and wherein the ending position is a sum of the corresponding bit position value and the corresponding bit length value.

13. The network component of claim 12, wherein the sets of first storage units are configured to store sets of range checking parameters, wherein each of the packet field identifies each one of the plurality of packet field values.

14. The network component of claim 9, further comprising:
a plurality of second storage units configured to store a plurality of precedence field values, said plurality of second storage units correspond to the plurality of entries.

15. The network component of claim 14, wherein the action implementation unit is configured to implement the at least one first action corresponding to one of the plurality of second storage units having a greatest precedence field value, wherein the greatest precedence field value is identified from the plurality of precedence field values corresponding to the plurality of entries having at least one of the plurality of packet field values falling within the corresponding pair of range values.

16. The network component of claim 14, wherein the action implementation unit is configured to implement the at least one second action corresponding to one of the plurality of second storage units having a greatest precedence field value, wherein the greatest precedence field value is identified from the plurality of precedence field values corresponding to the plurality of entries having each one of the plurality of packet field values falling within each one of the corresponding pair of range values.

17. A system for processing a packet in a communication network, said system comprising:
a receiving means for receiving a packet within a network device;
a first determining means for determining a plurality of packet field values with respect to the packet based on sets of range checking parameters within a rules table;

a first identifying means for identifying a plurality of range values as set forth in the sets of range checking parameters within a plurality of entries of the rules table;

a first implementing means for implementing at least one first action with respect to the packet when at least one of the plurality of packet field values falls within a corresponding pair of range values for one of the plurality of entries;

a second implementing means for implementing at least one second action with respect to the packet when each one of the plurality of packet field values falls within each corresponding pair of range values for one of the plurality of entries; and a third implementing means for implementing at least one third action with respect to the packet when each one of the plurality of the packet field values does not fall within each corresponding pair of range values.

18. The system of claim 17, wherein the first determining means comprises:

a second identifying means for identifying a plurality of bit positions within the packet as set forth in the sets of range checking parameters, wherein at least one of the plurality of bit positions corresponds to a bit position value; and a third identifying means for identifying a plurality of bit lengths as set forth in the sets of range checking parameters, wherein at least one of the plurality of bit lengths corresponds to a bit length value.

19. The system of claim 18, wherein the first determining means further comprises:

a second determining means for determining a plurality of packet fields, wherein at least one of the plurality of packet fields begins at a respective bit position and ends at an ending position, wherein the ending position is a sum of a corresponding bit position value and a corresponding bit length value.

20. The system of claim 17, wherein the first identifying means comprises:

a second identifying means for identifying a plurality of starting range values and a plurality of respective ending range values as set forth in the sets of range checking parameters within the rules table.

21. The system of claim 17, further comprising:

a second identifying means for identifying a plurality of precedence field values corresponding to the plurality of entries when the at least one of the plurality of packet field values falls within the corresponding pair of range values for more than one of the plurality of entries.

22. The system of claim 21, further comprising:

a second determining means for determining a greatest precedence field value from the plurality of precedence field values that correspond to the more than one of the plurality of entries having at least one of the plurality of packet field values falling within the corresponding pair of range values; and a fourth implementing means for implementing the at least one first action corresponding to the greatest precedence field value.

23. The system of claim 17, further comprising:

a second identifying means for identifying a plurality of precedence field values corresponding to the plurality of entries when each one of the plurality of packet field values falls within each one of the corresponding pair of range values for more than one of the plurality of entries.

24. The system of claim 23, further comprising:

a second determining means for determining a greatest precedence field value from the plurality of precedence field values that correspond to the more than one of the plurality of entries having each one of the plurality of packet field values falling within each one of the corresponding pair of range values; and a fourth implementing means for implementing the at least one second action corresponding to the greatest precedence field value.

* * * * *